United States Patent
Li et al.

(10) Patent No.: US 12,489,981 B2
(45) Date of Patent: Dec. 2, 2025

(54) DYNAMIC LIGHTING FOR PLANT IMAGING

(71) Applicant: Deere & Company, Moline, IL (US)

(72) Inventors: Yueqi Li, San Jose, CA (US); Erich Schlaepfer, Sunnyvale, CA (US)

(73) Assignee: Deere & Company, Moline, IL (US)

( * ) Notice: Subject to any disclaimer, the term of this patent is extended or adjusted under 35 U.S.C. 154(b) by 458 days.

(21) Appl. No.: 17/859,489

(22) Filed: Jul. 7, 2022

(65) Prior Publication Data

US 2024/0015405 A1  Jan. 11, 2024

(51) Int. Cl.
*H04N 23/74* (2023.01)
*G06T 7/00* (2017.01)
*G06V 10/70* (2022.01)
*G06V 20/10* (2022.01)

(52) U.S. Cl.
CPC ........... *H04N 23/74* (2023.01); *G06T 7/0004* (2013.01); *G06V 10/70* (2022.01); *G06V 20/188* (2022.01); *G06T 2207/20081* (2013.01); *G06T 2207/30188* (2013.01)

(58) Field of Classification Search
CPC ...... H04N 23/74; G06V 10/70; G06V 10/141; G06V 10/82; G06V 20/188; G06T 2207/20081; G06T 2207/30188; G06T 7/0004
See application file for complete search history.

(56) References Cited

U.S. PATENT DOCUMENTS

| | | | |
|---|---|---|---|
| 10,757,861 B2* | 9/2020 | Robertson | B25J 5/005 |
| 10,959,383 B2* | 3/2021 | Lys | G01K 1/026 |
| 11,184,967 B2* | 11/2021 | Coleman | H05B 45/12 |
| 11,613,201 B2* | 3/2023 | Li | G06V 20/56 |
| | | | 315/82 |
| 11,789,453 B2* | 10/2023 | Chowdhary | G06T 7/155 |
| | | | 382/110 |

(Continued)

OTHER PUBLICATIONS

Arad, B.; Kurtser, P.; Barnea, E.; Harel, B.; Edan, Y.; Ben-Shahar, O. Controlled Lighting and Illumination-Independent Target Detection for Real-Time Cost-Efficient Applications. The Case Study of Sweet Pepper Robotic Harvesting. Sensors 2019, 19, 1390. https://doi.org/10.3390/s19061390 (Year: 2019).*

(Continued)

*Primary Examiner* — Chan S Park
*Assistant Examiner* — Paulo Andres Garcia
(74) *Attorney, Agent, or Firm* — Fenwick & West LLP

(57) ABSTRACT

Various implementations include processing an instance of image data using a reinforcement learning policy model to generate illumination output, where the illumination output indicates one or more lights of an agricultural robot or modular sensor package to adjust based on uneven illumination in the instance of image data. In many implementations, the initial instance of image data is captured using one or more sensors of an agricultural robot or modular sensor package, where the initial instance of image data captures one or more crops in a portion of a plot of land. In various implementations, the agricultural robot or modular sensor package can adjust one or more lights based on the illumination output, and can capture an updated instance of image data of the given one or more crops with the updated illumination.

20 Claims, 7 Drawing Sheets

(56) References Cited

U.S. PATENT DOCUMENTS

| | | | |
|---|---|---|---|
| 11,827,286 B2* | 11/2023 | Demski | F21S 41/657 |
| 2016/0183477 A1* | 6/2016 | Kao | G05D 23/1917 |
| | | | 315/307 |
| 2021/0158041 A1 | 5/2021 | Chowdhary et al. | |
| 2021/0212298 A1* | 7/2021 | Messana | A01K 61/13 |
| 2021/0219394 A1 | 7/2021 | van der Sijde et al. | |
| 2022/0222798 A1* | 7/2022 | Panigrahi | G06T 7/0004 |
| 2022/0243876 A1* | 8/2022 | Pahlevaninezhad | G02B 1/002 |
| 2023/0079259 A1* | 3/2023 | Deljkovic | G03B 15/05 |
| | | | 382/110 |

OTHER PUBLICATIONS

Hesheng Wang, Jingchuan Wang, Weidong Chen, Lifei Xu, Automatic illumination planning for robot vision inspection system, Neurocomputing, vol. 275, 2018, pp. 19-28, https://doi.org/10.1016/j.neucom.2017.05.015. (Year: 2017).*

Zemmour, E.; Kurtser, P.; Edan, Y. Automatic Parameter Tuning for Adaptive Thresholding in Fruit Detection. Sensors 2019, 19, 2130. https://doi.org/10.3390/s19092130 (Year: 2019).*

Jiawang et al. Fast plug-in capacitors polarity detection with morphology and SVM fusion method in automatic optical inspection system. SIViP 17, 2555-2563 (2023). https://doi.org/10.1007/s11760-022-02472-0, See Fig. 5 for examiner interpretation of "lightbox" as discussed in Chowdhary. (Year: 2023).*

S. Uddin et al., "LEDs as energy efficient lighting systems: A detail review," 2011 IEEE Student Conference on Research and Development, Cyberjaya, Malaysia, 2011, pp. 468-472, doi: 10.1109/SCOReD.2011.6148785, Leontaris as [53]. (Year: 2011).*

Velickovic et al., Intelligent LED Matrix Lighting System of Modern Vehicles, University of Niš, Eight International Conference Transport and Logistics Proceedings, p. 163-166. Relevant preliminary search results for "subset" language discussed in interview, LED matrix control. (Year: 2021).*

Lampros, L. et al., "An Autonomous Illumination System for Vehicle Documentation Based on Deep Reinforcement Learning"; IEEE Access, vol. 9; pp. 75336-75348; dated May 19, 2021.

European Patent Office; International Search Report and Written Opinion issued in Application No. PCT/US2023/024427; 11 pages; dated Aug. 4, 2023.

* cited by examiner

DYNAMIC LIGHTING FOR PLANT IMAGING

BACKGROUND

As agricultural data mining and planning becomes more commonplace, the amount of data analyzed, and the number of sources providing that data, is increasing rapidly. Various types of machine learning models can be trained to perform a variety of agricultural tasks based on processing image(s) capturing plants (such as crops, weeds, etc.). For example, a machine learning model can be trained to predict a crop yield of a plot of land based on images capturing crops planted on the plot of land. However, the accuracies of these machine learning models rely largely on the training data used to train them. For instance, uneven lighting in the captured image data can reduce the accuracies of these machine learning models.

SUMMARY

Implementations disclosed herein are directed towards training a reinforcement learning model to dynamically adjust the lighting of images capturing crops. In some implementations, the system can capture image data of crops (e.g., crops in a field, crops on a farm, crops on a portion of a farm, crops on a plot of land, etc.). For example, an image data can capture one or more corn plants growing in a field.

As a given plant grows, the light needed to illuminate image data capturing the given plant can change. For example, overhead light may be sufficient to illuminate the image data when the plant is a seedling. However, as the plant grows, the overhead light may become insufficient to illuminate the image data of the growing plant. For instance, part of the given plant (e.g., the stem, the leaves, the fruit, one or more additional or alternative portions of the plant, and/or combinations thereof) may block overhead light from illuminating the lower portion(s) of the plant. In other words, the overhead light may be insufficient to illuminate image data capturing the lower portion(s) of the given plant as the plant grows.

In some implementations, the image data can be captured using one or more cameras of an agricultural robot. Additionally or alternatively, the agricultural robot can include one or more lights to aid in illuminating the image data captured by the agricultural robot. For example, the agricultural robot can include a variety of lighting such as one or more spotlights, one or more standalone lights, one or more light matrices, one or more additional or alternative lights, and/or combinations thereof. In some of those implementations, the lighting may be adjustable, such as one or more lights may be turned on, one or more lights may be turned off, the brightness of one or more lights may be adjusted, the location of one or more lights may be adjusted, etc. For example, the lights can include a LED light matrix including many smaller lights. One or more lights in the LED light matrix may be turned on or off to alter the illumination of image data (i.e., image data captured via camera(s) of the agricultural robot).

In some implementations, a machine learning model can be used to process image data to generate output indicating one or more lights of the agricultural robot to adjust based on uneven illumination in the image data. For example, the system can obtain or retrieve initial image data capturing a tomato plant, where the leaves of the tomato plant shade a lower portion of the stem of the tomato plant. The image data (i.e., image data capturing the tomato plant) can be processed using a reinforcement learning model (e.g., a policy network portion of a reinforcement learning model), where the reinforcement learning model has been trained to generate output indicating light(s) to adjust based on the initial image data.

Additionally or alternatively, the system can adjust the one or more lights based on the output of the reinforcement learning model. In continuation of the tomato plant example above, the output (i.e., output generated based on processing the tomato plant image data using the reinforcement learning model) can be used to adjust one or more lights of the agricultural robot. For example, a given light of the agricultural robot can be turned on, where the given light was turned off while the initial image data was captured, and where turning on the given light can illuminate the portion of the stem of the tomato plant that is shaded from overhead light by the plant's leaves.

Updated image data of the tomato plant can be captured after the lighting has been adjusted (e.g., after the given light has been turned on). In some implementations, a reinforcement learning reward can be generated based on processing the initial image data and the updated image data. In some implementations, the reward can be generated based on processing the updated image data and/or the initial image data using one or more image processing techniques. For instance, the initial image data can be processed to generate an initial sharpness score corresponding to the initial image data. Similarly, the updated image data can be processed to generate an updated sharpness score corresponding to the updated image data. The reward can be generated based on comparing the initial sharpness score and the updated sharpness score.

In some implementations, the reward can be used to update one or more portions of the policy. For instance, the system can determine an initial tomato plant sharpness score and an updated tomato plant sharpness score. The system can generate the reward based on processing the initial tomato plant sharpness score and the updated tomato plant sharpness score. In some of those implementations, the reward can be used to update one or more portions of the policy. Additionally or alternatively, the reward can be generated based on processing the initial image data and the updated image data using a reward model.

Accordingly, various implementations set forth techniques for adjusting the illumination in instance(s) of image data capturing one or more agricultural plants in a field. In some implementations, an initial instance of image data can be processed using a trained policy network to generate illumination output, where the illumination output indicates one or more areas (e.g., one or more pixels) of the initial instance of image data to adjust. For example, the illumination output can indicate one or more areas of the initial instance of image data to increase the light provided by the agricultural robot to reduce unevenness of the light (e.g., shadows) in the initial instance.

Image data captured using an agricultural robot can be used in a variety of ways such as controlling one or more actions by the agricultural robot in real time (or near real time). Additionally or alternatively, the image data can be processed using a crop yield prediction model to generate a predicted crop yield for the farm, for multiple farms, for the region, for the country, etc. As an additional non-limiting example, the image data can be processed using a growth prediction model to generate a predicted growth rate for the crops (which can then in turn be used to estimate an optional harvest date for the crops). The accuracy of predictions made using such models are dependent on the quality of the image data captured by the agricultural robot. By increasing the evenness of the illumination in captured image data, the data can be used to generate more accurate predicted output.

In many implementations, existing techniques are unable to adequately measure an optimal amount of light to illuminate crops in image data. For example, different portions of the plants can reflect different amounts of light (e.g., the leaves of a plant may be shiny and therefore reflect different light compared to the stem of the plant), the different components of the soil can reflect different amounts of light, the plant bedding may be covered with plastic and different types of plastic can reflect different amounts of light. For instance, a given plant with plant bedding covered in white plastic will reflect vastly different amounts of light compared to the given plant with plant bedding covered in black plastic. This can lead to vastly different predicted lighting for the given plant based on the white plastic compared to the black plastic, while the optimal lighting for the given plant should be the same regardless of the background. Implementations disclosed herein can generate illumination output to adjusting lighting in image data tailored to the plant itself.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
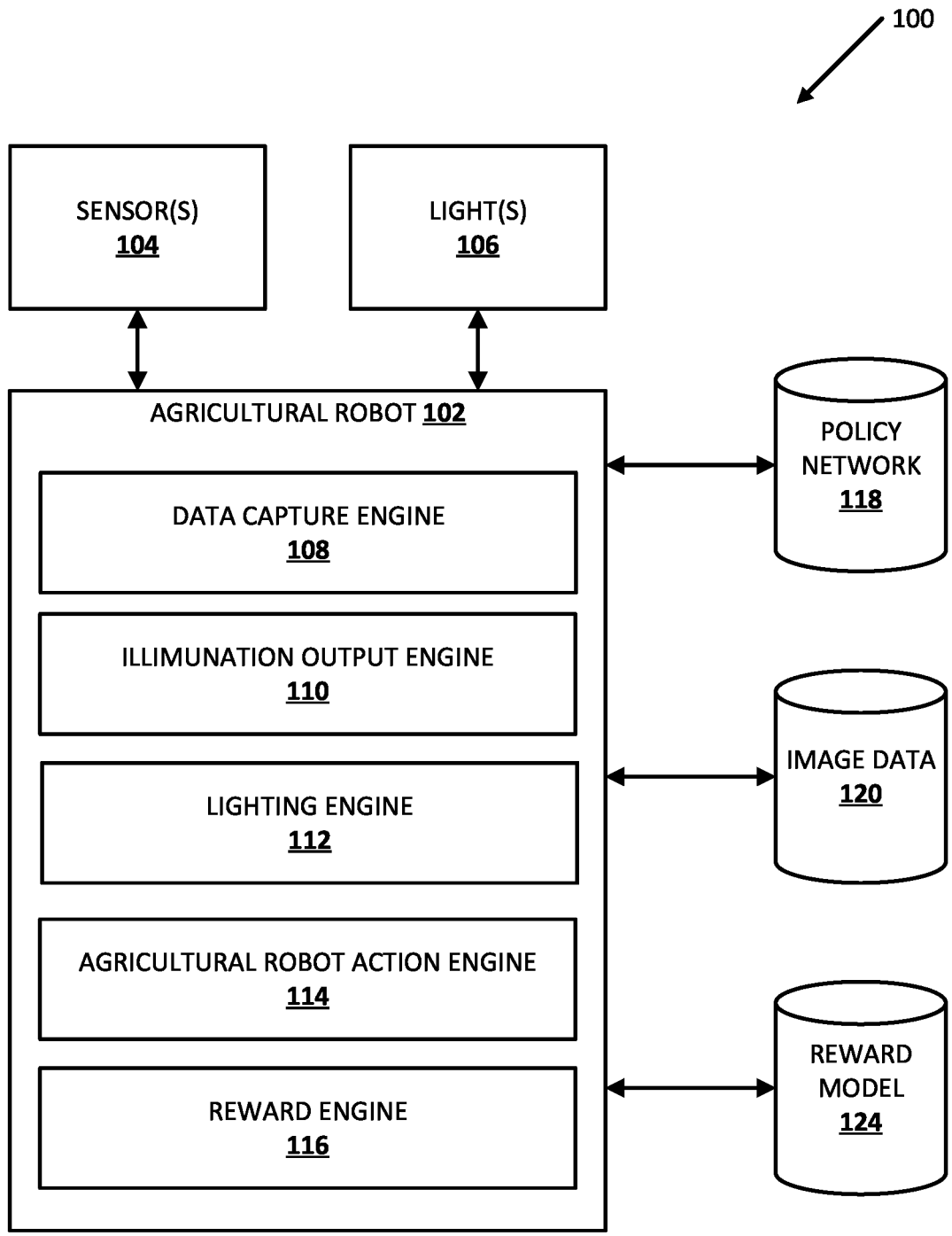
FIG. 1 illustrates an example environment in which various implementations can be implemented.

Turning now to the figures, FIG. 1 illustrates an example environment 100 in which implementations described herein may be implemented. The example environment can include one or more agricultural areas (not depicted) and various equipment that may be deployed at or near those areas, as well as other components that may be implemented elsewhere, in order to practice selected aspects of the present disclosure. Various components in the environment may communicate with each other over one or more networks (not depicted). The network(s) may take various forms, such as one or more local or wide area networks (e.g., the Internet), one or more personal area networks ("PANs"), one or more mesh networks (e.g., ZigBee, Z-Wave), one or more additional or alternative networks, and/or combinations thereof.

Agricultural area(s) may be used to grow various types of crops that may produce plant parts of economic and/or nutritional interest. Agricultural area(s) may include, for example, one or more crop fields, one or more plots, one or more gardens, one or more greenhouses, or any other areas in which there may be a desire to capture image data of particular types of plants.

Plants may take any form depending on the circumstances, and may include, but are not limited to, plants such as strawberry plants, soybeans, beans, corn, cabbage, lettuce, spinach, wheat, berries, etc. Additionally or alternatively, plants can include weeds such as, but are not limited to, dandelions, waterhemp, giant ragweed, marestail (also commonly known as horseweed), common lambsquarters, common groundsel, field pansy, mayweek or dog fennel, pineapple-weed or chamomile, several pigweeds, white campion, yellow woodsorrel, yellow nutsedge, etc.

In some implementations, one or more robots, such as agricultural robot 102, may be deployed to perform various agricultural tasks. Performance of some of these tasks, including by not limited to adjusting the illumination in captured image data, may be performed using machine learning model(s) described herein. An individual agricultural robot 102 may take various forms, such as an unmanned aerial vehicle, a robot that is propelled along a wire, track, rail or other similar component that passes over and/or between crops, wheeled robots, legged robots, additional or alternative types of robots and/or combinations thereof.

In some implementations, different robots may have different roles, e.g., depending on their capabilities. For example, in some implementations one or more robots may be designed to capture data, others may be designed to manipulate plants or perform physical agricultural tasks, and/or others may do both.

Robot 102 may include one or more various types of sensors 104 such as vision sensors (e.g., 2D digital cameras, 3D cameras, 2.5D cameras, infrared cameras, LiDAR sensors, etc.), inertial measurement ("IMU") sensors, Global Positioning System ("GPS") sensors, X-ray sensors, moisture sensors, lasers, barometers (for local weather information), photodiodes (e.g., for sunlight), thermometers, etc. Additionally or alternatively, robot 102 can include one or more lights 106. The light(s) 106 can be used to alter illumination in captured sensor data. In some implementations, the one or more lights 106 can include a variety of lighting such as one or more spotlights, one or more stand-alone lights, one or more light matrices, one or more additional or alternative lights, and/or combinations thereof. In some of those implementations, the lighting may be adjustable, such as one or more lights may be turned on, one or more lights may be turned off, the brightness of one or more lights may be adjusted, hue can be altered, the location of one or more lights may be adjusted, etc. For example, the lights can include a LED light matrix including many smaller lights. One or more lights in the LED light matrix may be turned on or off to alter the illumination of image data (i.e., image data captured via camera(s) of the agricultural robot).

In some implementations, agricultural robot 102 can include data capture engine 108, illumination output engine 110, lighting engine 112, agricultural robot action engine 114, reward engine 116, one or more additional or alternative engines (not depicted), and/or combinations thereof. Additionally or alternatively, agricultural robot 102 can be associated with a reinforcement learning policy network 118, image data 120, reward model 124, one or more additional or alternative components (not depicted), and/or combinations thereof.

Data capture engine 108 can cause agricultural robot 102 to capture one or more instances of sensor data via one or more of the sensors 104. For example, data engine 108 can cause the robot to capture an instance of image data via one or more cameras. In some implementations, data engine 108 can cause the robot to capture an initial instance of image data via one or more cameras of the robot, where the initial instance of image data includes uneven illumination of a portion of a plot of crops. In some implementations, the initial instance of image data can be captured using an initial configuration of the one or more lights 106. For example, the one or more lights can include an LED light matrix, where one or more of the LEDs are turned on, turned off, set to a specific brightness, set to a specific color, etc. in the initial configuration of the lights. Additional or alternative lights can be turned on, turned off, set to a specific brightness, set to a specific color, etc. For example, data capture engine 108 can capture an initial instance of image data of a given corn plant via one or more sensors 104, where the corn plant is illuminated with the initial configuration of light(s) 106 as well as additional or alternative ambient light (e.g., sunlight, additional light(s) not controlled by the robot, etc.).

Furthermore, the data capture engine 108 can capture an updated instance of image data, where the illumination of the updated instance image data has been adjusted using illumination output as described below. In furtherance of the example above, the updated instance of image data can capture the given corn plant where the initial configuration of light(s) 106 has been adjusted using the illumination output to an updated configuration of light(s) 106.

Illumination output engine 110 can process instance(s) of sensor data using policy network 118 to generate illumination output. In some implementations, the policy network 118 is a policy network portion of a reinforcement learning model, where the policy has been trained to identify area(s) of uneven illumination in image data. For example, policy network 118 can identify a shaded area at the base of the given corn plant based on processing the initial instance of image data. Additionally or alternatively, policy network 118 can be used to generate illumination output, where the illumination output indicates one or more lights 106 to adjust based on processing the instance of image data. In some of those implementations, the illumination output indicates light(s) 106 that will more evenly illuminate the area captured in the instance of image data. For instance, the illumination output can indicate one or more lights 106 to adjust such that the shaded area at the base of the given corn plant is more evenly illuminated. In some implementations, lighting engine 112 can adjust one or more lights 106 of the agricultural robot 102 based on the illumination output generated using illumination output engine 110.

In various implementations, agricultural robot action engine 114 may be configured to cause the agricultural robot 102 to perform one or more actions. In some of those implementations, the agricultural robot action engine 114 can process an instance of image data, an updated instance of image data, one or more additional or alternative instances of sensor data, and/or combinations thereof. For example, agricultural robot action engine 114 can cause agricultural robot 102 to identify and extract a weed from a plot of land, determine an amount and apply the determined amount of fertilizer to a plot of land, determine moisture content of soil and water the plot of land based on the moisture content, perform one or more additional or alternative agricultural actions, and/or combinations thereof. In some implementations, instance(s) of image data can be stored as image data 120 for additional or alternative processing. For example, instances of image data 120 can be processed remote from the agricultural robot to generate a predicted crop yield for a region of multiple farms. The initial instance of image data, the updated instance of image data, one or more additional or alternative instances of image data, and/or combinations thereof can be stored as image data 120.

In some implementations, the reward engine 116 can generate a reward based on the updated instance of image data. In some of those implementations, reward engine 116 can generate the reward based on processing, using the reward model 124, the updated instance of image data, the initial instance of image data, the illumination output, one or more additional instances of image data (e.g., previous instance(s) of image data, etc.), one or more additional instances of sensor data, one or more additional instances of data, and/or combinations thereof. Additionally or alternatively, the reward engine 116 can update one or more portions of the policy network based on the generated reward.

In some implementations, the reward engine 116 can process the updated instance of image data using reward model 124 to generate the reward. In some of those implementations, the reward model 124 can be configured to perform a variety of image processing techniques, such as processing the updated instance of image data to generate an image sharpness score which indicates the differences in pixel values in an instance of image data (e.g., the contrast between different pixels in the instance of image data). In some implementations, the reward engine 116 can process the updated instance of image data (e.g., the instance of image data capturing the illumination output generated using illumination output engine 110) using reward model 124 to generate an updated sharpness score. In some of those implementations, the reward engine 116 can generate the reward based on the updated sharpness score. Additionally or alternatively, the reward engine 116 can generate the reward based on an updated sharpness score and an initial sharpness score. By comparing the sharpness scores of the initial instance of image data and the updated instance of image data, the generated reward can reflect improvement(s) (if any) to evenness of the illumination in the update instance of image data. In some other implementations, the reward model 124 can be a machine learning model trained to evaluate the illumination in the updated instance of image data.

In some implementations, agricultural robot 102 can use a pre-trained policy network 118, where the policy network is not updated while the agricultural robot 102 is capturing image data of crops. In some of those implementations, the agricultural robot 102 may not generate a reward using reward engine 116 described herein.

Techniques described herein are not limited to adjusting lighting of agricultural robots. Techniques described herein may be performed to alter illumination in other scenarios.

For example, modular sensor packages may be affixed to agricultural equipment such as tractors, boom sprayers, center pivots, etc., so that the modular sensor packages may be carried through fields to acquire sensor data, similar to agricultural robots. These modular sensor packages may also include processors and memory storing instructions that, when executed by the processors, cause the processors to perform selected aspects of the present disclosure. These sensor packages may also include, or may be configured to control, various lights that are integral with the sensor packages or separate (e.g., lights of the vehicle that carries the sensor package). Accordingly, when any example is described herein as being performed by an agricultural robot, especially as it pertains to dynamic lighting, it should be understood that a modular sensor package may perform the same techniques.

Figure 2A:
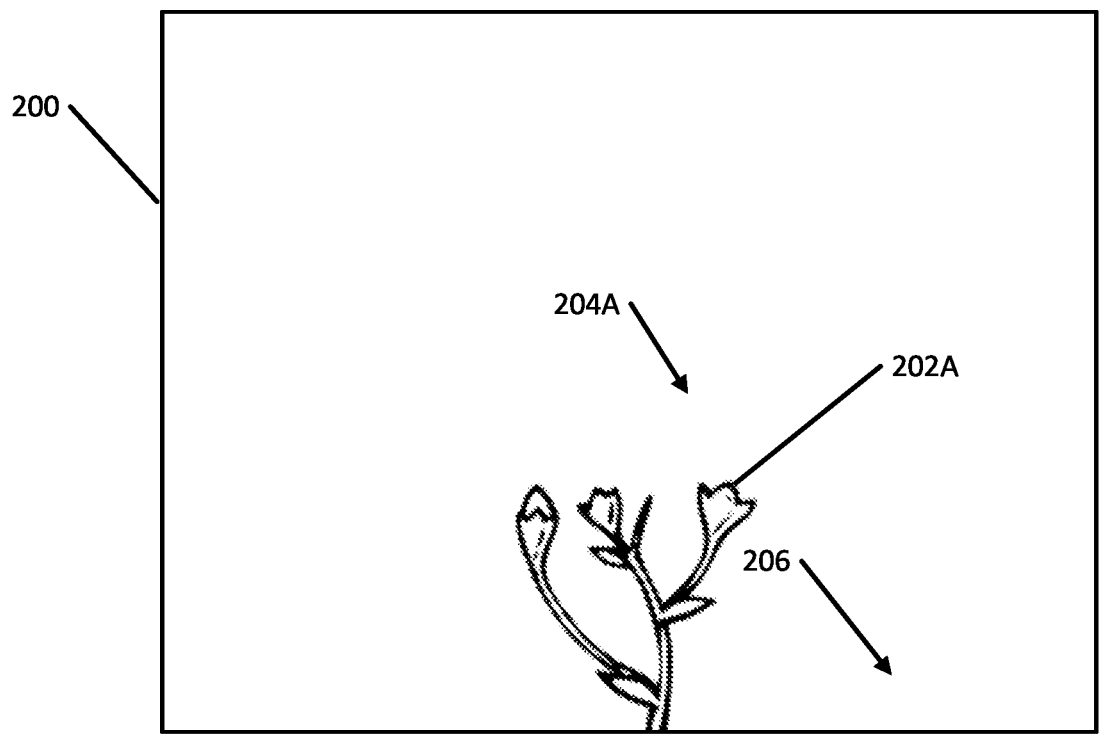
FIG. 2A illustrates an example of image data capturing a crop in accordance with implementations disclosed herein.

FIG. 2A illustrates an example environment 200 of a plant 202A growing in a field. In the illustrative example, plant 202A is a small immature plant. Plant 202A is illuminated by an overhead light source 204A. Plant 202A is small, so the overhead light source 204A can pass around portions of the plant and illuminate the ground 206 next to the plant 202A. In some implementations, the plant 202A with overhead light 204A can be captured in an instance of image data in accordance with techniques described herein.

Figure 2B:
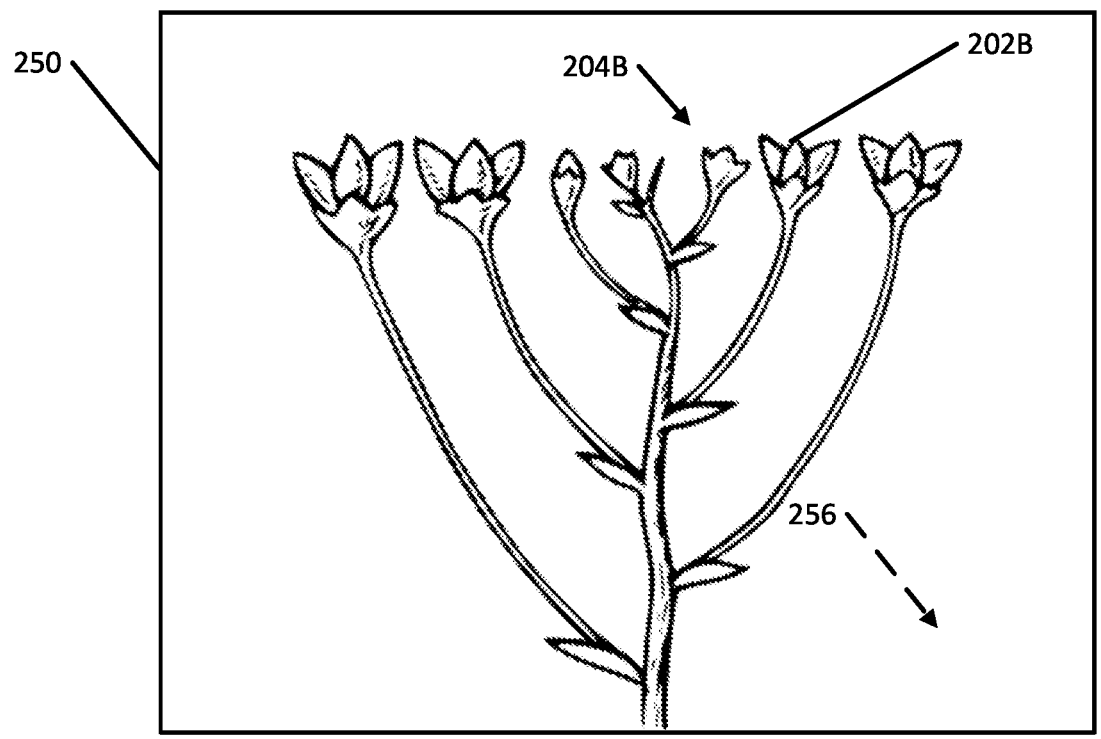
FIG. 2B illustrates another example of image data capturing a crop in accordance with implementations disclosed herein.

FIG. 2B illustrates an additional example environment 250 of a plant 202B growing in a field. In the illustrated example, plant 202B is the same plant as 202A growing in the same field, but at a later date where plant 202B is fully grown. Plant 202B can be illuminated once again by an overhead light source 204B, where overhead light source 204B is substantially similar to overhead light source 204A. However, plant 204B is a fully grown plant, and one or more portions of plant 202B block illumination of the ground 256 by overhead light source 204B.

In some implementations, an agricultural robot (such as agricultural robot 102 as described herein with respect to FIG. 1) or modular sensor package can capture a first instance of image data capturing plant 202A with overhead light 204A and ground illumination 206. Additionally or alternatively, the agricultural robot or modular sensor package can capture a second instance of image data capturing plant 202B with overhead lighting 204B and ground illumination 256. While the first instance of image data and the second instance of image data are capturing the same plant at different growth stages, with substantially similar overhead illumination, the ground illumination in the instances of image data is different with ground 256 having more shadows than ground 206. In some implementations, different light configurations (and thus corresponding different illumination output) can be used to improve the lighting of instances of image data, despite the instances of image data capturing the same plant with the same overhead light. For instance, illumination output corresponding to plant 202A illustrated in FIG. 2A may indicate dimming an overhead light based on the brightness of the overhead illumination 204A. Furthermore, illumination output based on processing an instance of image data capturing plant 202B illustrated in FIG. 2B may indicate dimming an overhead light based on the brightness of the overhead illumination 204B. However, the dark area of the ground 256 in FIG. 2B may require additional or alternative illumination to correct uneven illumination. In some of those implementations, the illumination data based on processing an instance of image data capturing plant 202B may additionally or alternatively adjust one or more additional lights of the agricultural robot or modular sensor package, such as one or more lights on the side of the robot roughly perpendicular to the plant 202B.

Figure 3:
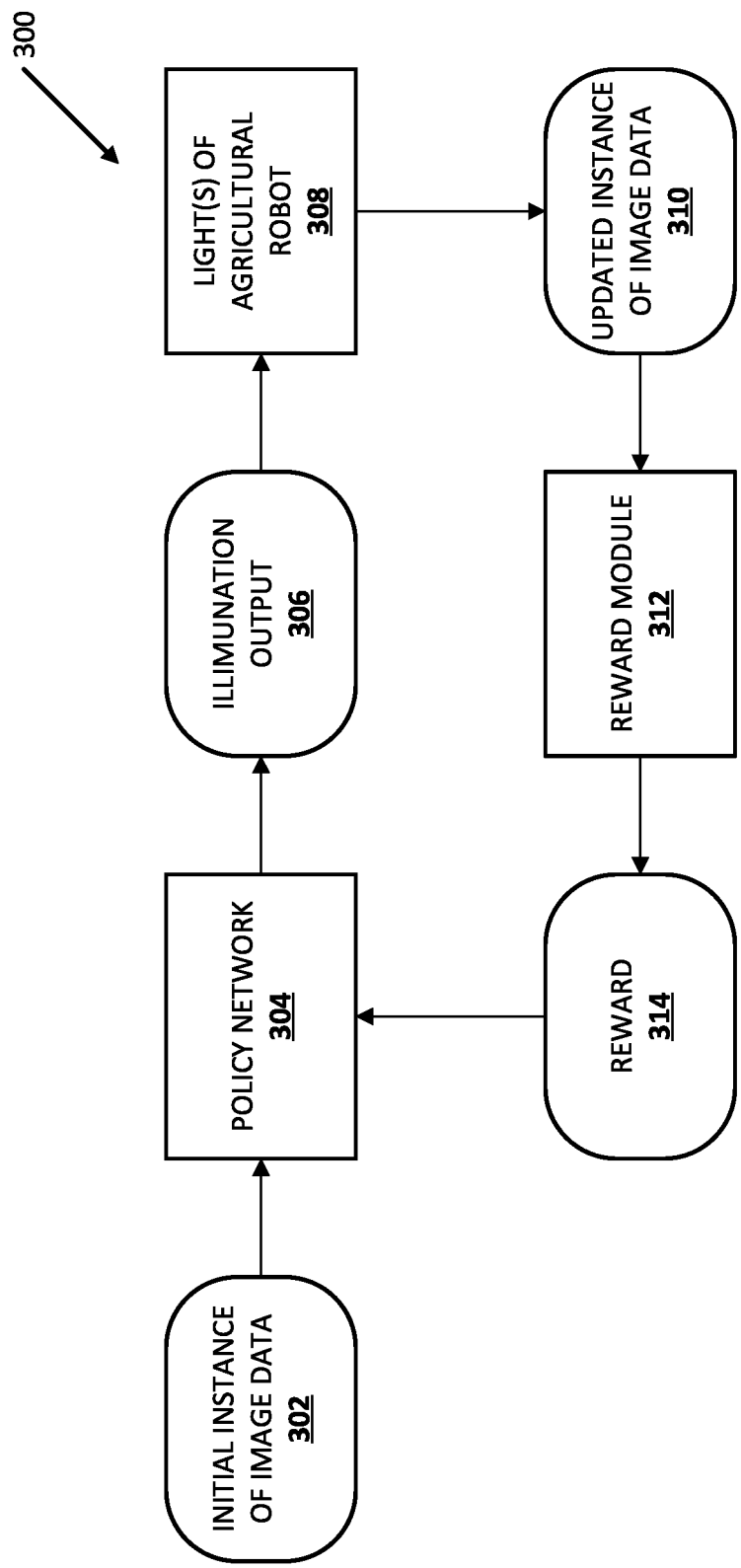
FIG. 3 is a block diagram illustrating an example of updating a policy network in accordance with implementations disclosed herein.

FIG. 3 illustrates an example 300 of updating a policy network 302 in accordance with implementations described herein. An initial instance of image data 302 can be processed using policy network 304 to generate illumination output 306. In some implementations, the initial instance of image data 302 can be captured using one or more sensors (e.g., one or more cameras) of an agricultural robot or modular sensor package, such as one or more sensors 104 of agricultural robot 102 described with respect to FIG. 1. For example, an initial instance of image data can capture a particular plant in a garden.

In some implementations, policy network 304 can be trained to identify one or more unevenly illuminated portions of the initial image data 302, such as identifying one or more pixels in the initial image data with uneven illumination. Additionally or alternatively, policy network 304 can generate illumination output 306 indicating one or more lights of the agricultural robot 308 to adjust based on the uneven illumination captured in the initial instance of image data 302. Light(s) 308 can include a variety of lights associated with the agricultural robot or modular sensor package such as, but not limited to, one or more spotlights, one or more overhead lights, one or more LEDs, one or more lights in a light matrix (such as a LED light matrix), one or more additional or alternative lights controllable by, but not directly connected to, the agricultural robot or modular sensor package, one or more additional or alternative lights, and/or combinations thereof.

The one or more lights 308 of the agricultural robot or modular sensor package can be adjusted based on the illumination output 306. For example, a specific light can be turned on, a specific light can be turned off, the brightness of a specific light can be adjusted, the color of a specific light can be adjusted. In some implementations, illumination output 306 can indicate the adjustment of multiple lights 308. For example, the illumination output 306 can indicate the adjustment of a subset of the lights in an LED light matrix (including all of the lights in the LED light matrix). By adjusting individual LEDs in a light matrix, the agricultural robot or modular sensor package can adjust illumination in additional instances of image data at the pixel level. Additionally or alternatively, the agricultural robot or modular sensor package can adjust the position of one or more sensors of the robot or modular sensor package (such as the position of one or more cameras of the robot) based on the illumination output 306. For example, adjusting the position of a camera of the agricultural robot or modular sensor package can change the angle between the camera and the captured instance of image data. This change in angle can alter the illumination of one or more pixels in the captured instance of image data.

In some implementations, the agricultural robot or modular sensor package can capture an updated instance of image data 310 after the one or more lights 308 have been adjusted. Additionally or alternatively, the reward module 312 can process the updated instance of image data 310 to generate a reward 314. For example, the reward module 314 can generate a reward 314 in accordance with reward engine 116 described above with respect to FIG. 1. Furthermore, the reward 314 can be used to update one or more portions of the policy network 304 in accordance with reinforcement learning techniques.

Figure 4:
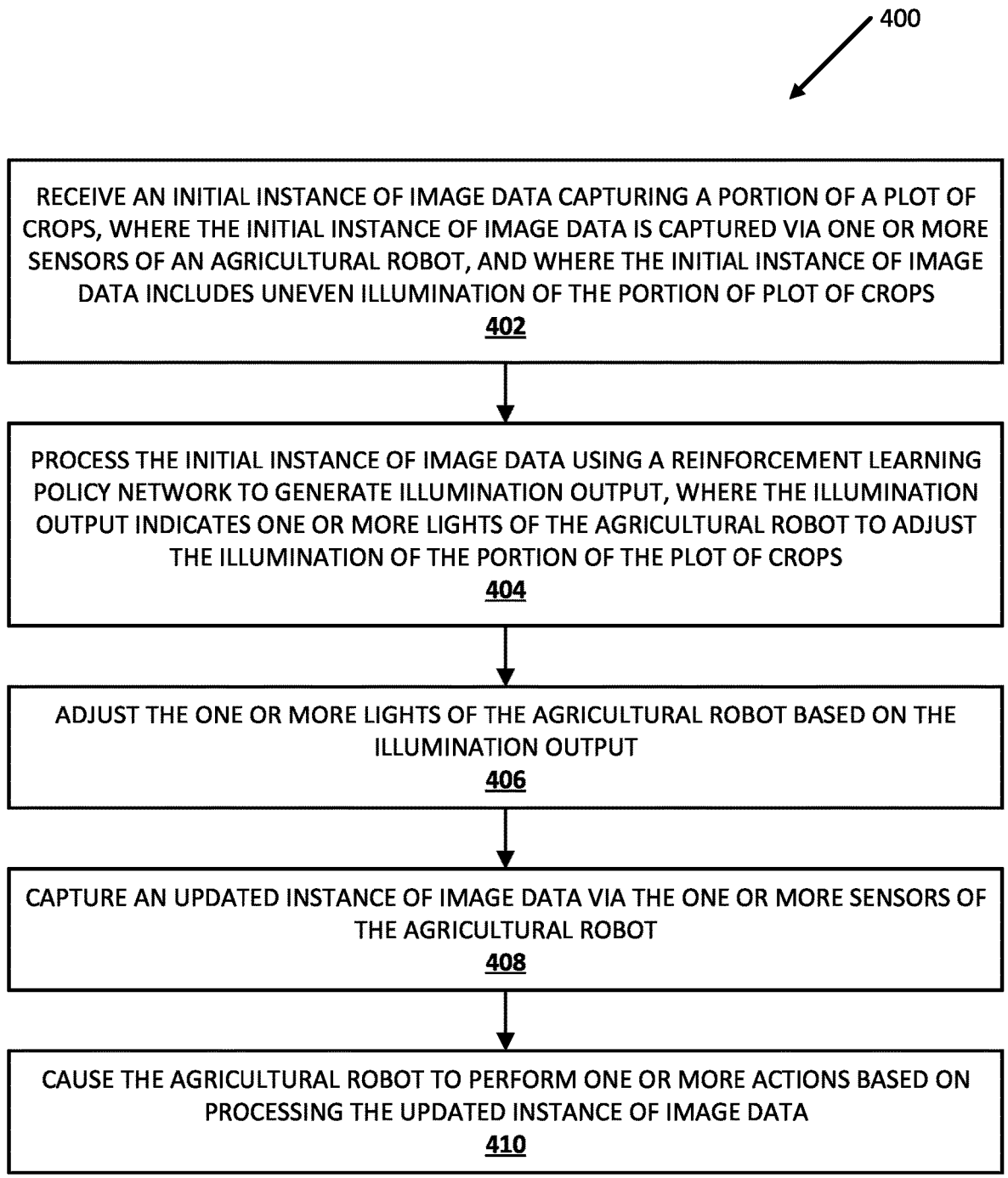
FIG. 4 is a flowchart illustrating an example process in accordance with implementations disclosed herein.

FIG. 4 is a flowchart illustrating an example process 400 of generating an updated instance of image data in accordance with implementations described herein. For convenience, the operations of process 400 are described with reference to a system that performs the operations. This system may include various components of various computer systems, such as one or more components depicted in FIG. 1, FIG. 6, and/or FIG. 7. Moreover, while operations of process 400 are shown in a particular order, this is not meant to be limiting. One or more operations may be reordered, omitted, and/or added.

At block 402, the system receives an initial instance of image data capturing a portion of a plot of crops. In some implementations, the initial instance of image data is captured via one or more sensors of an agricultural robot or modular sensor package. Additionally or alternatively, the initial instance of image data can include uneven illumination of the portion of the plot of crops. In some implementations, the initial instance of image data can be captured using one or more sensors, such as one or more sensors 104 of agricultural robot 102 described herein with respect to FIG. 1. For example, the agricultural robot can capture an initial instance of image data capturing three basil plants in a field via a camera mounted to the robot. The initial instance of image data capturing the three basil plants can be captured on a cloudy day. The reduced natural sunlight (compared to a bright sunny day) can cause uneven illumination of one or more portions (e.g., one or more pixels) of the initial instance of image data. Similarly, an alternative initial instance of image data can capture one or more portions of uneven illumination between the leaves of the three basil plants, where parts of one basil plant shield one or more other parts of the other basil plants from light.

Additionally or alternatively, the agricultural robot or modular sensor package can capture additional sensor data corresponding to the initial instance of image data. For example, the system can capture the temperature of one or more components of the robot.

At block 404, the system processes the initial instance of image data using a reinforcement learning policy network to generate illumination output. In some implementations, the illumination output indicates one or more lights to adjust the illumination of the portion of the plot of crops (such as one or more lights 106 as described herein with respect to FIG. 1). For example, if the initial instance of image data capturing the three basil plants is captured on a cloudy day, the illumination output can indicate adjusting one or more lights to increase the overhead illumination of three basil plants.

At block 406, the system adjusts one or more lights of the agricultural robot or modular sensor package based on the illumination output. In some implementations, the system can turn one or more lights on, turn one or more lights off, adjust the brightness of one or more lights, adjust the color of one or more lights, adjust the position of one or more lights, etc. For example, the basil plants captured in the initial instance of image data (i.e., the initial instance of image data capturing the three basil plants can be captured on a cloudy day), the system can turn on three overhead lights and increase the brightness of a fourth overhead light based on the illumination output. In some of those implementations, adjusting the overhead lighting can increase the illumination in the unevenly illuminated portion(s) of the initial instance of image data. Similarly, the basil plants captured in the additional initial instance of image data (i.e., where parts of one basil plant shield one or more other parts of the other basil plants from light), the system can adjust the brightness of a set of LEDs on the side of the agricultural robot or modular sensor package to increase the illumination between the basil plants.

At block 408, the system captures an updated instance of image data via the one or more sensors. In some implementations, the system can capture the updated instance of image data using one or more sensors 104 of agricultural robot 102 described with respect to FIG. 1.

In some implementations, the system can strobe the lights in synchronization with the camera(s) capturing the updated instance of image data. In other words, the system can turn on the lights of the agricultural robot or modular sensor package while the camera(s) are capturing the instance of image data in accordance with the illumination output. In some of those implementations, the system can begin strobing the lights slightly before the camera(s) capture the updated instance of image data to prevent shadows that may otherwise be generated by sudden illumination.

At block 410, the system causes the agricultural robot or modular sensor package to perform one or more actions based on processing the updated instance of image data. For example, the agricultural robot or modular sensor package can store the initial instance of image data, the updated instance of image data, one or more additional or alternative instances of sensor data locally at the robot or modular sensor package. Locally stored image data can be processed by the agricultural robot for performing tasks such as, but not limited to, identifying weeds and extracting them, identifying soil moisture content and applying water based on the moisture content, etc. Additionally or alternatively, the robot or modular sensor package can transmit the image data to a remote server for additional processing. For instance, the image data for a field on a single day can be processed to generate a predicted crop growth rate, the image data for a field over many days can be processed to generate a predicted crop yield, etc.

Figure 5:
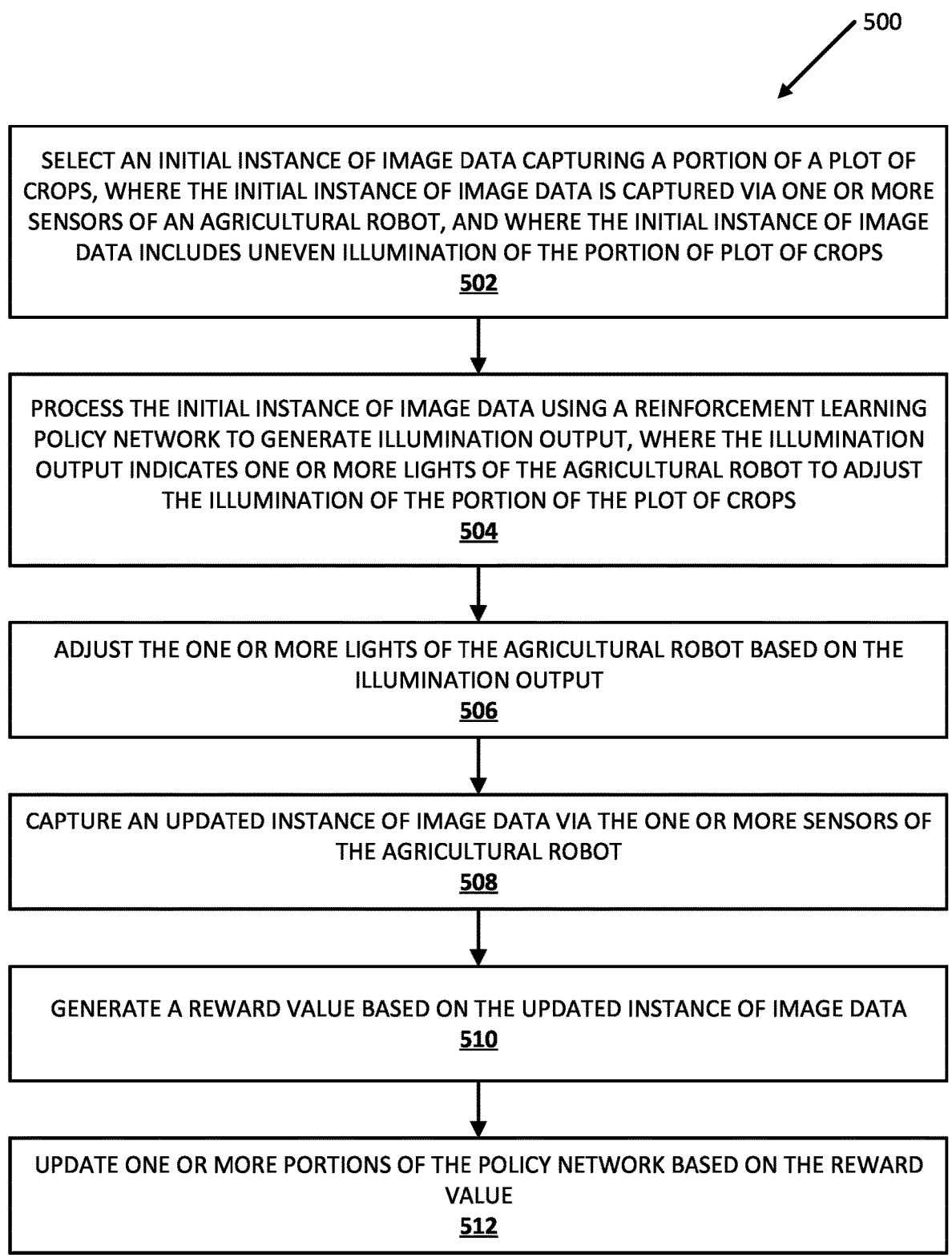
FIG. 5 is a flowchart illustrating another example process in accordance with implementations disclosed herein.

FIG. 5 is a flowchart illustrating an example process 500 of updating one or more portions of a reinforcement learning policy in accordance with implementations described herein. For convenience, the operations of process 500 are described with reference to a system that performs the operations. This system may include various components of various computer systems, such as one or more components depicted in FIG. 1, FIG. 6, and/or FIG. 7. Moreover, while operations of process 500 are shown in a particular order, this is not meant to be limiting. One or more operations may be reordered, omitted, and/or added.

At block 502, the system selects an initial instance of image data capturing a portion of a plot of crops. In some implementations, the initial instance of image data is captured via one or more sensors of an agricultural robot or modular sensor package. In some implementations, the initial instance of image data includes uneven illumination of the portion of the plot of crops. In some implementations, the system can select the initial instance of image data in accordance with block 402 described with respect to FIG. 4.

At block 504, the system processes the initial instance of image data using a reinforcement learning policy network to generate illumination output. In some implementations, the illumination output indicates one or more lights of the agricultural robot or modular sensor package to adjust the illumination of the portion of the plot of crops. In some implementations, the system can process the initial instance of image data using the reinforcement learning policy network in accordance with block 404 described with respect to FIG. 4.

At block 506, the system adjusts the one or more lights of the agricultural robot or modular sensor package based on the illumination output. In some implementations, the system can adjust the one or more lights in accordance with block 406 described with respect to FIG. 4.

At block 508, the system captures an updated instance of image data via the one or more sensors of the agricultural robot or modular sensor package. In some implementations, the system can capture the updated instance of image data in accordance with block 408 described with respect to FIG. 4.

At block 510, the system generates a reward value based on the updated instance of image data. In some implementations, the reward can be generated in accordance with reward engine 116 as described in FIG. 1. In some implementations, the system can utilize a reinforcement learning policy network which is not updated while the agricultural robot or modular sensor package is performing tasks. In some other implementations, the policy network can be updated while the agricultural robot is performing tasks.

In some implementations, the policy network can be updated based on a reward at each iteration of generating an updated instance of image data based on illumination output. In some other implementations, the policy network can be updated less frequently, such as updating the policy network at a set time interval (e.g., updating the policy network every second, every minute, every hour, and/or at one or more additional or alternative intervals), when specific actions are performed (e.g., when the agricultural robot is powered on, when the agricultural robot captures image data covering a specific acreage of a field, when the agricultural robot captures image data covering a specific row of crops, when the agricultural robot captures image data coverings specific crop, when the agricultural robot captures a threshold number of instances of image data, when the agricultural robot performs one or more additional or alternative actions, and/or combinations thereof), in one or more additional or alternative situations, and/or combinations thereof.

At block 512, the system updates one or more portions of the policy network based on the reward value.

Figure 6:
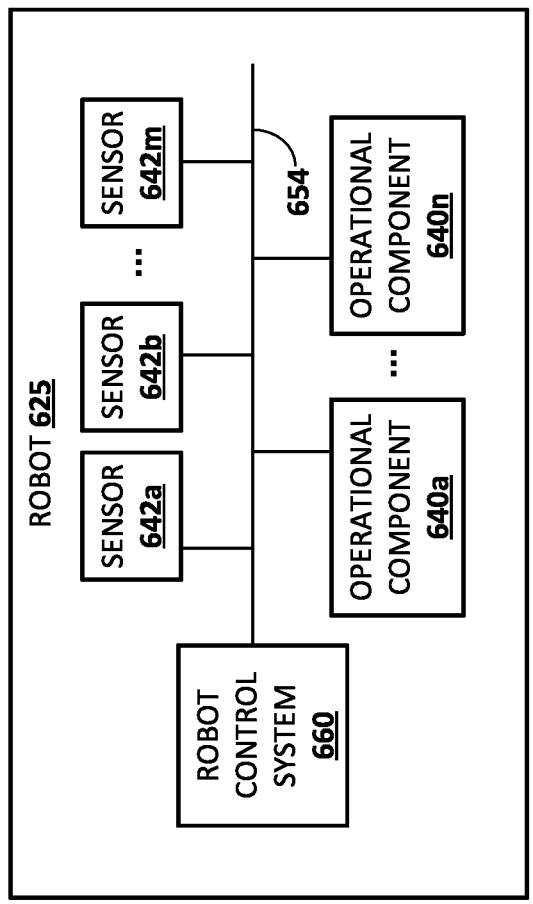
FIG. 6 schematically depicts an example architecture of a robot.

FIG. 6 schematically depicts an example architecture of a robot 625. The robot 625 includes a robot control system 660, one or more operational components 640a-640n, and one or more sensors 642a-642m. The sensors 642a-642m may include, for example, vision sensors, light sensors, pressure sensors, pressure wave sensors (e.g., microphones), proximity sensors, accelerometers, gyroscopes, thermometers, barometers, and so forth. While sensors 642a-m are depicted as being integral with robot 625, this is not meant to be limiting. In some implementations, sensors 642a-m may be located external to robot 625, e.g., as standalone units. The robot control system 660, operational components 640a-640n, and sensors 642a-642m may be communicatively connected by a bus 654.

Operational components 640a-640n may include, for example, one or more end effectors and/or one or more servo motors or other actuators to effectuate movement of one or more components of the robot. For example, the robot 625 may have multiple degrees of freedom and each of the actuators may control the actuation of the robot 625 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 625. In some implementations, the robot 625 may comprise a "brain box" that may include all or aspects of the control system 660. For example, the brain box may provide real time bursts of data to the operational components 640a-n, with each of the real time bursts comprising a set of one or more control commands that dictate, inter alia, the parameters of motion (if any) for each of one or more of the operational components 640a-n. In some implementations, the robot control system 660 may perform one or more aspects of processes 400 and/or 500 described herein. As described herein, in some implementations all or aspects of the control commands generated by control system 660 can position limb(s) of robot 625 for robotic locomotion tasks. Although control system 660 is illustrated in FIG. 6 as an integral part of robot 625, in some implementations, all or aspects of the control system 660 may be implemented in a component that is separate from, but in communication with robot 625. For example, all or aspects of control system 660 may be implemented on one or more computing devices that are in wired and/or wireless communication with the robot 625, such as computing device 710.

Figure 7:
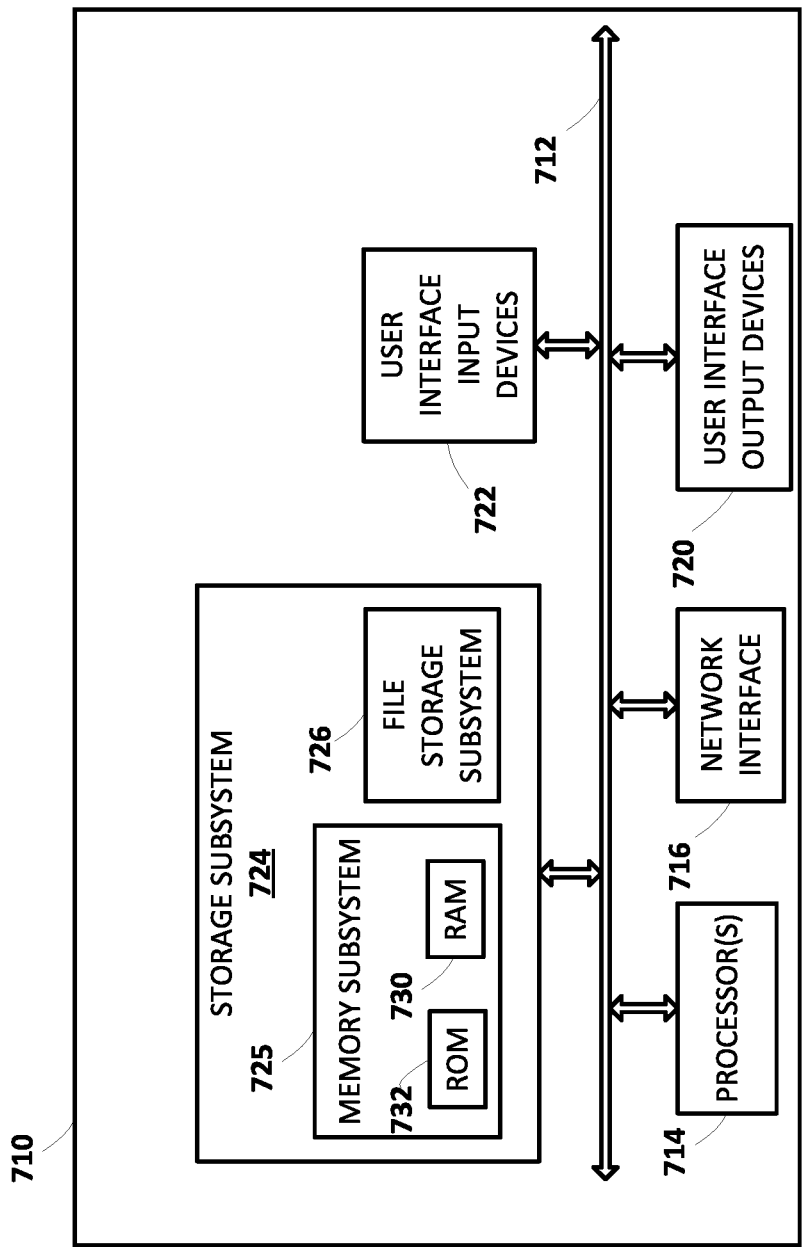
FIG. 7 schematically depicts an example architecture of a computer system.

FIG. 7 is a block diagram of an example computing device 710 that may optionally be utilized to perform one or more aspects of techniques described herein. For example, in some implementations computing device 710 may be utilized to provide desired locomotion by robot 625 and/or other robots, and/or may be integral with the aforementioned modular sensor package. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the process of FIGS. 4 and/or 5.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple buses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors, the method includes receiving an initial instance of image data, wherein the initial instance of image data captures at least a portion of a plot of crops, wherein the initial instance of image data is captured via one or more sensors of an agricultural robot, and wherein one or more portions of the initial instance of image data includes uneven illumination of the portion of the plot of crops. In some implementations, the method further includes processing the initial instance of image data using a reinforcement learning policy to generate illumination output, wherein the illumination output indicates one or more lights of the agricultural robot to adjust the illumination of the portion of the plot of crops. In some implementations, the method further includes adjusting the one or more lights of the agricultural robot based on the illumination output. In some implementations, the method further includes capturing an updated instance of image data via the one or more sensors of the agricultural robot. In some implementations, the method further includes causing the agricultural robot to perform one or more actions based on processing of the updated instance of image data.

These and other implementations of the technology can include one or more of the following features.

In some implementations, the method further includes processing the updated instance of image data. In some implementations, the method further includes generating a reward based on the processing of the updated instance of image data. In some implementations, the method further includes updating one or more portions of the reinforcement learning policy based on the generated reward. In some versions of those implementations, processing the updated instance of image data includes processing the updated instance of image data using an image data sharpness algorithm to generate an updated image sharpness score. In some versions of those implementations, the method further includes processing the initial instance of image data using the image sharpness algorithm to generate an initial image sharpness score. In some versions of those implementations, generating the reward based on the processing of the updated instance of image data includes generating the reward based on processing the updated image sharpness score and the initial image sharpness score.

In some implementations, the method further includes processing the updated instance of image data comprises processing the updated instance of image data using an illumination machine learning model to generate an image illumination score indicating the evenness of illumination in the instance of image data. In some versions of those implementations, the method further includes processing the initial instance of image data using the illumination machine learning model to generate an initial image illumination score. In some versions of those implementations, generating the reward based on the processing of the updated instance of image data includes generating the reward based on processing the updated image illumination score and the initial image illumination score.

In some implementations, the lights of the agricultural robot include a light emitting diode (LED) light matrix. In some versions of those implementations, the LED light matrix is affixed to the top of the agricultural robot and one or more LEDs in the LED light matrix provide overhead illumination in a given instance of image data of the portion of the plot of crops. In some versions of those implementations, the LED light matrix is affixed to one or more sides of the agricultural robot and one or more LEDs in the LED light matrix provide illumination along the side of a plant in a given instance of image data of the portion of the plot of crops.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

We claim:

1. A method implemented by one or more processors, the method comprising:
receiving an initial instance of image data, wherein the initial instance of image data captures at least a portion of a plot of crops during a first stage of growth, wherein the initial instance of image data is captured via one or more sensors of an agricultural robot, and wherein one or more portions of the initial instance of image data includes uneven illumination of the portion of the plot of crops;
processing the initial instance of image data using a reinforcement learning policy to generate illumination output, wherein the illumination output indicates an updated configuration of a subset of lights of the agricultural robot to adjust the illumination of the portion of the plot of crops, and wherein the illumination output is tailored to the first stage of growth captured in the initial instance of image data;
adjusting the subset of lights of the agricultural robot based on the illumination output, wherein adjusting the subset of lights comprises strobing one or more lights to change an angle of the illumination upon the portion of the plot of crops in synchronization with capturing an updated instance of image data via the one or more sensors of the agricultural robot;
causing the agricultural robot to perform one or more actions based on processing of the updated instance of image data;
receiving a subsequent instance of image data, wherein the subsequent instance of image data captures at least a portion of the same plot of crops during a second stage of growth; and
processing the subsequent instance of image data using the reinforcement learning policy to generate an updated illumination output, wherein the updated illumination output indicates an updated configuration of the subset of lights of the agricultural robot to adjust the illumination of the portion of the plot of crops, and wherein the illumination output is tailored to the second stage of growth captured in the subsequent instance of image data.

2. The method of claim 1, further comprising:
processing the updated instance of image data;
generating a reward based on the processing of the updated instance of image data; and
updating one or more portions of the reinforcement learning policy based on the generated reward.

3. The method of claim 2, wherein processing the updated instance of image data comprises processing the updated instance of image data using an image data sharpness algorithm to generate an updated image sharpness score.

4. The method of claim 3, further comprising processing the initial instance of image data using the image sharpness algorithm to generate an initial image sharpness score, and wherein generating the reward based on the processing of the updated instance of image data comprises:
generating the reward based on processing the updated image sharpness score and the initial image sharpness score.

5. The method of claim 2, wherein processing the updated instance of image data comprises processing the updated instance of image data using an illumination machine learning model to generate an image illumination score indicating an evenness of illumination in the instance of image data.

6. The method of claim 5, further comprising processing the initial instance of image data using the illumination machine learning model to generate an initial image illumination score, and wherein generating the reward based on the processing of the updated instance of image data comprises:
generating the reward based on processing the updated image illumination score and the initial image illumination score.

7. The method of claim 1, wherein the lights of the agricultural robot include a light emitting diode (LED) light matrix.

8. The method of claim 7, wherein the LED light matrix is affixed to a top of the agricultural robot and one or more LEDs in the LED light matrix provide overhead illumination in a given instance of image data of the portion of the plot of crops.

9. The method of claim 7, wherein the LED light matrix is affixed to one or more sides of the agricultural robot and one or more LEDs in the LED light matrix provide illumination along the side of a plant in a given instance of image data of the portion of the plot of crops.

10. A non-transitory computer readable storage medium configured to store instructions that, when executed by one or more processors, cause the one or more processors to perform operations that include:
receiving an initial instance of image data, wherein the initial instance of image data captures at least a portion of a plot of crops during a first stage of growth, wherein the initial instance of image data is captured via one or more sensors of an agricultural robot, and wherein one or more portions of the initial instance of image data includes uneven illumination of the portion of the plot of crops;
processing the initial instance of image data using a reinforcement learning policy to generate illumination output, wherein the illumination output indicates an updated configuration of a subset of lights of the agricultural robot to adjust the illumination of the portion of the plot of crops, and wherein the illumination output is tailored to the first stage of growth captured in the initial instance of image data;
adjusting the subset of lights of the agricultural robot based on the illumination output, wherein adjusting the subset of lights comprises strobing one or more lights to change an angle of the illumination upon the portion of the plot of crops in synchronization with capturing an updated instance of image data via the one or more sensors of the agricultural robot;
causing the agricultural robot to perform one or more actions based on processing of the updated instance of image data;
receiving a subsequent instance of image data, wherein the subsequent instance of image data captures at least a portion of the same plot of crops during a second stage of growth; and
processing the subsequent instance of image data using the reinforcement learning policy to generate an updated illumination output, wherein the updated illumination output indicates an updated configuration of the subset of lights of the agricultural robot to adjust the illumination of the portion of the plot of crops, and wherein the illumination output is tailored to the second stage of growth captured in the subsequent instance of image data.

11. The non-transitory computer readable storage medium of claim 10, where in the operations further include:
  processing the updated instance of image data;
  generating a reward based on the processing of the updated instance of image data; and
  updating one or more portions of the reinforcement learning policy based on the generated reward.

12. The non-transitory computer readable storage medium of claim 11, wherein processing the updated instance of image data comprises processing the updated instance of image data using an image data sharpness algorithm to generate an updated image sharpness score.

13. The non-transitory computer readable storage medium of claim 12, wherein the operations further include processing the initial instance of image data using the image sharpness algorithm to generate an initial image sharpness score, and wherein generating the reward based on the processing of the updated instance of image data includes:
  generating the reward based on processing the updated image sharpness score and the initial image sharpness score.

14. The non-transitory computer readable storage medium of claim 10, wherein the lights of the agricultural robot include a light emitting diode (LED) light matrix.

15. The non-transitory computer readable storage medium of claim 14, wherein the LED light matrix is affixed to a top of the agricultural robot and one or more LEDs in the LED light matrix provide overhead illumination in a given instance of image data of the portion of the plot of crops.

16. The non-transitory computer readable storage medium of claim 14, wherein the LED light matrix is affixed to one or more sides of the agricultural robot and one or more LEDs in the LED light matrix provide illumination along the side of a plant in a given instance of image data of the portion of the plot of crops.

17. A system comprising:
  one or more processors; and
  memory configured to store instructions, that when executed by the one or more processors cause the one or more processors to perform operations that include:
    receiving an initial instance of image data, wherein the initial instance of image data captures at least a portion of a plot of crops during a first stage of growth, wherein the initial instance of image data is captured via one or more sensors of an agricultural robot, and wherein one or more portions of the initial instance of image data includes uneven illumination of the portion of the plot of crops;
    processing the initial instance of image data using a reinforcement learning policy to generate illumination output, wherein the illumination output indicates an updated configuration of a subset of lights of the agricultural robot to adjust the illumination of the portion of the plot of crops, and wherein the illumination output is tailored to the first stage of growth captured in the initial instance of image data;
    adjusting the subset of lights of the agricultural robot based on the illumination output, wherein adjusting the subset of lights comprises strobing one or more lights to change an angle of the illumination upon the portion of the plot of crops in synchronization with capturing an updated instance of image data via the one or more sensors of the agricultural robot;
    causing the agricultural robot to perform one or more actions based on processing of the updated instance of image data;
    receiving a subsequent instance of image data, wherein the subsequent instance of image data captures at least a portion of the same plot of crops during a second stage of growth; and
    processing the subsequent instance of image data using the reinforcement learning policy to generate an updated illumination output, wherein the updated illumination output indicates an updated configuration of the subset of lights of the agricultural robot to adjust the illumination of the portion of the plot of crops, and wherein the illumination output is tailored to the second stage of growth captured in the subsequent instance of image data.

18. The system of claim 17, where in the operations further include:
  processing the updated instance of image data;
  generating a reward based on the processing of the updated instance of image data; and
  updating one or more portions of the reinforcement learning policy based on the generated reward.

19. The system of claim 18, wherein processing the updated instance of image data comprises processing the updated instance of image data using an image data sharpness algorithm to generate an updated image sharpness score.

20. The system of claim 19, wherein the operations further include processing the initial instance of image data using the image sharpness algorithm to generate an initial image sharpness score, and wherein generating the reward based on the processing of the updated instance of image data includes:
  generating the reward based on processing the updated image sharpness score and the initial image sharpness score.

* * * * *